US012123970B2

(12) United States Patent
Wu et al.

(10) Patent No.: US 12,123,970 B2
(45) Date of Patent: Oct. 22, 2024

(54) RADAR COMMUNICATION WITH DISPARATE PULSE REPETITION FREQUENCY GROUPS

(71) Applicant: NXP B.V., Eindhoven (NL)

(72) Inventors: Ryan Haoyun Wu, San Jose, CA (US); Dongyin Ren, East Brunswick, NJ (US); Satish Ravindran, Santa Clara, CA (US)

(73) Assignee: NXP B.V., Eindhoven (NL)

( * ) Notice: Subject to any disclaimer, the term of this patent is extended or adjusted under 35 U.S.C. 154(b) by 446 days.

(21) Appl. No.: 17/484,119

(22) Filed: Sep. 24, 2021

(65) Prior Publication Data

US 2023/0095228 A1   Mar. 30, 2023

(51) Int. Cl.
*G01S 7/35* (2006.01)
*G01S 13/58* (2006.01)

(52) U.S. Cl.
CPC ............ *G01S 7/354* (2013.01); *G01S 13/584* (2013.01); *G01S 7/356* (2021.05)

(58) Field of Classification Search
None
See application file for complete search history.

(56) References Cited

U.S. PATENT DOCUMENTS

| | | | |
|---|---|---|---|
| 3,935,572 A | 1/1976 | Broniwitz et al. | |
| 5,276,453 A | 1/1994 | Heymsfield et al. | |
| 5,442,359 A * | 8/1995 | Rubin | G01S 13/582 |
| | | | 342/162 |
| 2016/0131752 A1 | 5/2016 | Jansen et al. | |
| 2018/0011170 A1 | 1/2018 | Rao et al. | |
| 2020/0049812 A1 | 2/2020 | Jansen | |
| 2020/0103515 A1 | 4/2020 | Kishigami et al. | |
| 2020/0233076 A1 * | 7/2020 | Chen | G01S 13/584 |
| 2020/0292663 A1 | 9/2020 | Bai et al. | |

(Continued)

FOREIGN PATENT DOCUMENTS

| | | | | |
|---|---|---|---|---|
| CN | 101943753 B | * | 6/2012 | |
| CN | 111580039 A | | 8/2020 | |
| WO | WO-2021031076 A1 | * | 2/2021 | ........... G01S 13/583 |

OTHER PUBLICATIONS

Shapir, I., "Doppler Ambiguity Resolving in TDMA Automotive MIMO Radar via Digital Multiple PRF", 2018 IEEE Radar Conference (RadarConf18), Apr. 23-27, 2018.

(Continued)

*Primary Examiner* — Vladimir Magloire
*Assistant Examiner* — Brandon James Henson

(57) ABSTRACT

Aspects of the present disclosure are directed to radar and radar processing. As may be implemented in accordance with one or more embodiments involving multi-input multi-output (MIMO) co-prime radar signals transmitted by a plurality of transmitters and reflected from at least one target, the reflected radar signals are processed by resolving ambiguities associated with a range-Doppler detection based on unique pulse repetition frequencies (PRF)s associated with respective chirp groups of the reflected radar signals. Phase compensation is applied to compensate for motion-induced phased biases and, thereafter, Doppler estimates are reconstructed to provide a dealiased version of the reflected radar signals.

20 Claims, 4 Drawing Sheets

(56) References Cited

U.S. PATENT DOCUMENTS

2021/0270952 A1* 9/2021 Fei .................. G01S 13/931
2022/0334240 A1* 10/2022 Wu .................. G01S 13/42

OTHER PUBLICATIONS

F. G. Jansen, "Automotive Radar Doppler Division MIMO With Velocity Ambiguity Resolving Capabilities," 2019 16th European Radar Conference (EuRAD), 2019, pp. 245-248.

D. J. Rabideau, "Doppler-offset waveforms for MIMO radar," 2011 IEEE RadarCon (RADAR), 2011, pp. 965-970.

F. Li, F. He, Z. Dong, M. Wu, Y. Zhang and Z. Sun, "Blind Velocities Mitigation for DDMA MIMO GMTI Radar Via Multi-Frequency Signals," 2018 19th International Radar Symposium (IRS), 2018, pp. 1-9.

J. Bechter, F. Roos and C. Waldschmidt, "Compensation of Motion-Induced Phase Errors in TDM MIMO Radars," in IEEE Microwave and Wireless Components Letters, vol. 27, No. 12, pp. 1164-1166, Dec. 2017.

M. Kronauge, C. Schroeder and H. Rohling, "Radar target detection and Doppler ambiguity resolution," 11th International Radar Symposium, Vilnius, Lithuania, 2010, pp. 1-4.

M. Musa and S. Salous, "Ambiguity elimination in HF FMCW radar systems," in IEE Proceedings—Radar, Sonar and Navigation, vol. 147, Issue 4, pp. 182-188, Aug. 2000.

K. Thurn, D. Shmakov, G. Li, S. Max, M. Meinecke and M. Vossiek, "Concept and Implementation of a PLL-Controlled Interlaced Chirp Sequence Radar for Optimized Range-Doppler Measurements," in IEEE Transactions on Microwave Theory and Techniques, vol. 64, No. 10, pp. 3280-3289, Oct. 2016.

Y. Li, C. Xu, X. Yan and Q. Liu, "An improved algorithm for Doppler ambiguity resolution using multiple pulse repetition frequencies," 2017 9th International Conference on Wireless Communications and Signal Processing (WCSP), 2017, pp. 1-5.

U.S. Appl. No. 17/233,952, filed Apr. 19, 2021, entitled: Radar Communications With Disparate Pulse Repetition Intervals. The Examiner is referred to the copending patent prosecution of the common Applicant (no attachment).

U.S. Appl. No. 17/109,317, filed Dec. 2, 2020, entitled:CO-PRIME Coded (CPC) Doppler Division Multiplexing (DDM) MIMO Radar Method and System. The Examiner is referred to the copending patent prosecution of the common Applicant (no attachment).

* cited by examiner

RADAR COMMUNICATION WITH DISPARATE PULSE REPETITION FREQUENCY GROUPS

OVERVIEW

Aspects of various embodiments are directed to radar communications involving the use of disparate pulse repetition frequencies for respective groups of chirps and/or transmitters.

A variety of radar communications may be utilized for many different applications. For instance, such communications may utilize Time Division Multiplexing (TDM) linear-chirp waveforms, or Doppler division multiplexing (DDM), for constructing multiple-in-multiple-out (MIMO) virtual aperture to achieve higher angular resolution in radar systems. For instance, such approaches may be utilized with mm-Wave Frequency Modulation Continuous Wave (FMCW) automotive radar systems. These approaches may facilitate MIMO transmission as well as the processing of received signals.

While such radar signaling can be useful, time multiplexing of chirps transmitted by different transmitter antennas may result in mismatched phase delays, as may be caused by motion of targets. Further complications may be presented during TDM MIMO and/or DDM MIMO operation in which the MIMO transmitters are transmitting at different times, with relative motion between radar and the targets. For instance, between any two transmitting periods, the movement of the target may result in a change in the distance to the radar's phase center. This change in distance translates to change in the round-trip phase delay of the return signals, causing phase offsets across the subsequent transmission periods. Compensating for such mismatched phase delays can be particularly challenging. These and other matters have presented challenges to radar implementations, for a variety of applications.

SUMMARY

Various example embodiments are directed to issues such as those addressed above and/or others which may become apparent from the following disclosure concerning radar signal processing and related determination of positional characteristics of a target or targets.

In certain example embodiments, aspects of the present disclosure involve utilizing grouped radar signals, each group having a disparate pulse repetition frequency (PRF), utilizing the disparate PRFs to resolve positional characteristics. Such an approach can be useful, for example, in addressing issues as noted above and, for example, as may apply to ascertaining the position of moving targets as may produce undesirable phase offset errors.

As may be implemented in accordance with a particular embodiment, a method for use in a radar apparatus is carried out as follows. In response to multi-input multi-output (MIMO) co-prime radar signals transmitted by a plurality of transmitters and reflected from at least one target, the reflected radar signals are processed by resolving ambiguities associated with a range-Doppler detection based on unique pulse repetition frequencies (PRF)s associated with respective chirp groups of the reflected radar signals. Phase compensation is applied to compensate for motion-induced phased biases. After the step of applying phase compensation, Doppler estimates are reconstructed to provide a dealiased version of the reflected radar signals.

In other specific example embodiments, an apparatus comprises receiver circuitry configured to receive multi-input multi-output (MIMO) co-prime radar signals transmitted by a plurality of transmitters and reflected from at least one target. The apparatus also comprises processing circuitry to process the reflected radar signals by resolving ambiguities associated with a range-Doppler detection, based on unique pulse repetition frequencies (PRF)s associated with respective chirp groups of the reflected radar signals. The processing circuitry is further configured to apply phase compensation to compensate for motion-induced phased biases and, after said step of applying phase compensation, reconstruct Doppler estimates to provide a dealiased version of the reflected radar signals.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
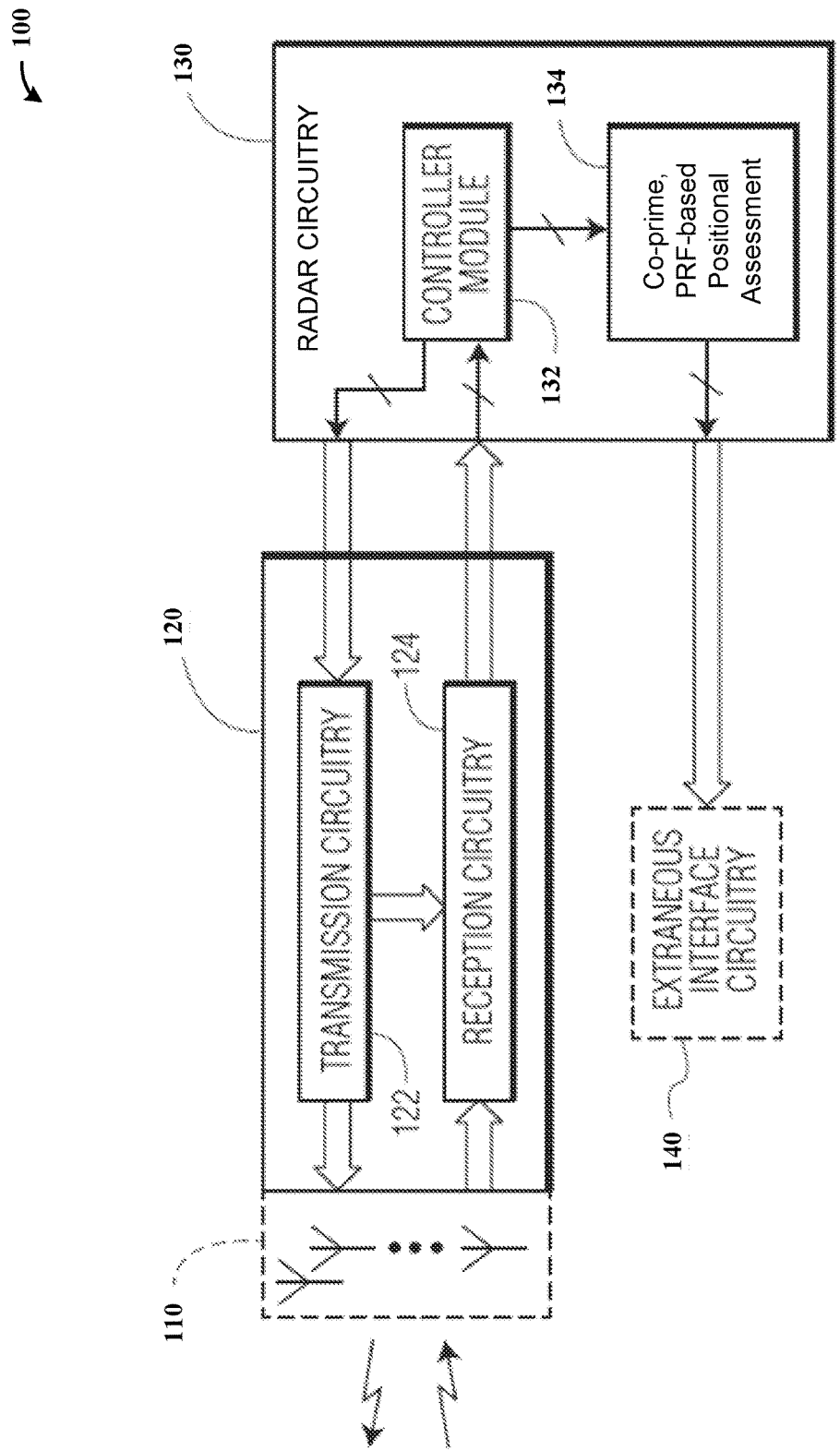
FIG. 1 is a system-level diagram illustrating an example radar communications system/apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar communications and utilization for ascertaining positional characteristics of one or more targets in an environment. In certain implementations, aspects of the present disclosure have been shown to be beneficial when used in the context of automotive radar, including radar signal processing circuitry. In some embodiments, distinct PRFs are used for transmitting respective groups of radar signals with co-prime Doppler spectral spacing, the reflections of which are detected and used with their respective PRFs to compensate for phase ambiguities. Such approaches may enhance radar accuracy, for instance in an automotive environment in which targets and/or an automobile employing radar circuitry is moving. Furthermore, multiple transmitters may transmit using shared timeslots, for instance with groups of three or more transmitters, and Doppler division may be used along with the co-prime spacing to sort out which transmissions correspond to specific transmitters. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In a particular embodiment, Doppler spectra are dealiased to resolve the ambiguity of range-Doppler detection by assigning a unique PRF to each chirp group of the transmitted chirp sequence in a single transmission frame. When receiving reflections, the Doppler spectrum of respective chirp groups may be computed and unrolled to multiple ±2π's extent. A correct Doppler shift or radial velocity detection may be identified as a peak position where all chirp groups' peaks are above a detection threshold and aligned. Phase compensation may then be applied to compensate motion induced phase biases before final Doppler estimates are reconstructed. In these contexts, the PRF may relate to 1/PRI (pulse repetition interval).

Ambiguous Doppler or radial velocity estimation problems in radar systems may be resolved in a variety of manners, as may be implemented with one or more embodiments. In one such embodiment involving fast chirp radar system, a target's Doppler shift or radial velocity is estimated by sampling in slow time (e.g., inter-chirp time) over multiple chirps. After range FFT processing, for each range cell across the slow time or the sequence of chirps, another FFT is applied to construct the Doppler shift spectrum. Target detection may be performed based on the obtained range Doppler map. The sampling in slow-time may be discrete with its sampling interval determined by the PRI (the time duration between two adjacent chirps of the same chirp group). Distinct PRI values are assigned to each chirp group resulting in distinct 2π-radial velocities ($V_{r,2\pi,i}$) for each chirp group. The spectrum is periodic in the Doppler shift or radial velocity domain and a 2π period is inversely related to the PRI based on the following relationships, where $f_{D,2\pi}$ is the 2π Doppler shift; $V_{r,2\pi}$ is the 2π-radial velocity; C is the speed of light; $f_c$ is the carrier frequency; and λ is the wavelength:

$$f_{D,2\pi} \equiv \frac{1}{PRI} = \frac{2V_{r,2\pi}f_c}{C} = \frac{2V_{r,2\pi}}{\lambda} \Rightarrow V_{r,2\pi} \equiv \frac{\lambda}{2*PRI}.$$

Radial velocity can be unambiguously described within the 0 to 2π spectrum region, between 0 and $V_{r,2\pi}$ [m/s], since velocity outside this region is ambiguous when attempting to measure it. The observable radial velocity, $V_{r,obs}$, is the modulo-2π of the true velocity, $V_{r0}$, based on the following relationship where mod(•) denotes the modulo operation, $V_{r,obs}$=mod($V_{r0}$, $V_{r,2\pi}$).

The sequence of chirps is separated into multiple interleaved chirp groups with each group transmitting their first chirps sequentially before they move onto the second chirp, and so on and so forth. Distinct PRI values are assigned to the chirp groups resulting in distinct 2π-radial velocities ($V_{r,2\pi,i}$) for the chirp groups. Denoting $V_{r,2\pi,i}$ as the 2π-radial velocity corresponding to chirp group-i, radial velocities greater than $V_{r,2\pi,i}$ fold onto the modulo-2π spectrum at different observable velocity for distinct chirp group-i's. The arrangement of the chirp sequences may be set to prevent overlapped chirp transmissions, where the chirps are transmitted by the same hardware resource.

Each transmitter the modulo-2π spectrums are unfolded into multiple ±2π extent (for example ±4π, ±6π, ±8π, . . . ). The true target radial velocity, if falling within the unfolded extent, may show up in the same radial velocity across all chirp groups' spectrums. In this case, the Doppler (or radial velocity) spectrums have peaks aligning at the same position and in contrast, the peaks are misaligned for incorrectly unfolded velocity. By identifying aligned spectral peaks in the unfolded spectrums, the ambiguity of the radial velocity measurements may be resolved.

For example, where m is an integer (i.e. m∈{0, ±1, ±2, . . . }), $$V_{r0}=V_{r,obs}+m*V_{r,2\pi}$$

the correct radial velocity $V_{r0}$ will occur in the m*2π to (m+1)*2π section of the unfolded spectrum and observed as aligned peaks at the spectrum position corresponding to $V_{r0}$. Unfolding or unwrapping may be carried out for detected spectrum peaks (e.g., are samples above a detection threshold and with magnitude higher than its two adjacent neighbors) to conserve computational power.

Once the unambiguous radial velocity is resolved, correct phase compensation can be applied to the chirp groups that follow the first group. For example, for a 3-chirp group system (e.g., as may be implemented with FIG. 3), chirp group 1 may start at t=0; chirp group 2 may start t=$CIT_1$, and chirp group 3 may start t=$CIT_2$, where $CIT_k$ denotes the chirp duration between the k-th chirp and its immediate next chirp (of a different transmitter). Therefore, all array elements' outputs obtained from chirp group-i's chirps include a common motion-induced phase error term, $A_i$. The value of $A_i$ can be computed using the following equation.

$$A_i = 4\pi/\lambda * V_{r0} * \Sigma_{k=1}^{i-1} CIT_k [Rad] \ (i=1 \ldots N, \text{ the number of chirp groups})$$

In such an instance, chirp group 1's constant PRI may be $PRI_1=CIT_1+CIT_2+CIT_3$; chirp group 2's constant PRI may be, $PRI_2=CIT_2+CIT_3+CIT_4$; and chirp group 3's constant PRI may be, $PRI_3=CIT_3+CIT_4+CIT_5$. Owing to the difference in the PRI, the CITs from chirp to chirp also varies and thus are non-uniform. By implementing multiple PRIs in a single frame (e.g., fusing multiple PRF's within a single frame), the Doppler ambiguity can be resolved within a single frame in which the selection of PRI is appropriately set. Ambiguity can be resolved by choosing PRFs (or $V_{r,2\pi}$ values) such that one PRF (or $V_{r,2\pi,i}$) value is not a factor of the other $PRF_{j\neq i}$ ($V_{r,2\pi,j\neq i}$). For example, random non-integer values and co-prime integer values (greatest common divisor of these values is 1) are good candidates for designing PRFs or $V_{r,2\pi}$ values that do not easily result in ambiguous unwrapped spectrums.

In a particular embodiment, a chirp sequence starting time of respective chirp groups 1, 2, and 3 is 0 μs, 30 μs, and 60

μs, respectively. The PRI's of each chirp group is: 120,000 ns for chirp group 1; 120,117 ns for chirp group 2; and 120,205 ns for chirp group 3. The respective 2π-radial velocity are (rounded to the 4-th decimal place, $f_c$ selected to be 79 GHz for example), 15.8228, 15.8074, and 15.7958 [m/s] respectively. Each chirp group includes 128 chirps, so the entire frame includes 384 chirps. The PRI's and chirp starting time are designed so that none of the chirp are overlapped with a minimum chirp duration of 30 μs (including active acquisition period and down time).

Embodiments characterized above or otherwise herein can be further combined with a concurrent-transmission MIMO waveform such as the DDM MIMO waveform. The combined approach allows the DDM MIMO radar to extend its maximum radial velocity capability, as may be useful in approaches for which this is not achievable using DDM MIMO waveform alone. In various implementations, DDM with transmitters' zero-Doppler positions encoded with specially selected spacing values are utilized. The spacing may be set as the difference between any 2 zero-Doppler positions of 2 adjacent transmitters in modulo-2π sense. In this combined approach, each chirp position of a chirp group includes of multiple chirps transmitted concurrently by DDM transmitters with co-prime coded zero-Doppler positions.

In a particular such embodiment, three chirp groups are used and 3 DDM-MIMO transmitters are employed. Such an approach may be implemented with FIG. 3. The zero-Doppler positions of the 3 transmitters are encoded at $ZD_1$, $ZD_2$, and $ZD_3$ [Rad], respectively. On receive, the processing follows the steps prescribed below.

1) Unfold the Doppler spectrum of each chirp group to a sufficient extent that covers the maximum radial velocity of interest.
2) For peaks above a detection threshold (e.g., CFAR threshold, noise detection threshold, etc. . . . ), consistency across all chirp groups is checked. If the peaks are aligned (in Doppler as well as in amplitude, within some tolerances), a resolved detection is declared, and the aligned peaks should be retained for further processing. If the peaks are not aligned, unresolved detections are declared, and these peaks should be discarded.
3) Once all resolved peaks are integrated, the correct source transmitter is associated to each peak. The association is carried out for each peak, by conducting the following procedure:
    a. For an N-transmitter DDM MIMO system, assume the encoded zero-Doppler positions of the transmitters are $[u_{1,2}, u_{2,3}, \ldots u_{N,1}]$ [Rad], respectively, where $u_{n,m}$ indicates the difference between transmitter m's zero-Doppler position and transmitter n's zero-Doppler position in the Doppler spectrum.
    b. If a peak under test ought to be associated to the transmitter-1, there should be N−1 peaks of similar magnitude occurring at $[u_{1,2}, u_{1,2}+u_{2,3}, \ldots u_{1,2}+u_{2,3} \ldots +u_{N-1,N}]$ [Rad] relative to the peak under test. Similarly, if a peak under test ought to be associated to the transmitter-2, there should be N−1 peaks of similar magnitude occurring at $[u_{2,3}, u_{2,3}+u_{3,4}, \ldots, u_{2,3}+u_{3,4}+ \ldots +u_{N,1}]$ [Rad] relative to the peak under test; and so on and so forth . . . and lastly if a peak under test ought to be associated to the transmitter-N, there should be N−1 peaks of similar magnitude occurring at $[u_{N,1}, u_{N,1}+u_{1,2}, \ldots, u_{N,1}+u_{1,2}+ \ldots +u_{N-2,N-1}]$ [Rad] relative to the peak under test.
    c. For each peak under test, count the number of peaks that matches the above decoding vector for each transmitter and tally the scores for all transmitters.
    d. The transmitter that results in highest matching score is associated to the peak under test. Note that when the zero-Doppler spacing values are co-prime values the decoding is the strongest as the chance of having same score from different transmitters is the minimal.
    e. The association procedure is repeated until all peaks are associated.
4) For the transmitter-associated peaks, based on the resolved radial velocity (relative to the associated zero-velocity), phase compensation is applied and the peak (complex value) are integrated (summed) to form a single peak value for further processing.

As may be implemented in accordance with one or more embodiments, MIMO co-prime radar signals are transmitted by a plurality of transmitters, reflected from one or more targets, and the reflections are processed by resolving ambiguities associated with a range. The signals may, for example, be transmitted using TDM or DDM signals. Doppler detection is carried out based on unique pulse repetition frequencies PRFs associated with respective chirp groups of the reflected radar signals. Each respective chirp group may correspond to a group of transmitters, with each transmitter group transmitting radar signals at a PRF that is different than respective PRFs of radar signals transmitted in another one of the transmitter groups. Phase compensation may be applied to compensate for motion-induced phased biases, and Doppler estimates may then be constructed to provide a dealiased version of the reflected radar signals.

The radar signals for respective ones of the chirp groups may be transmitted in a timeslot that is shared by at least two of the chirp groups. In some embodiments, the radar signals for each of the respective chirp groups may be transmitted at PRFs that are offset from PRFs used by the other chirp groups by a predetermined offset. Positional characteristics of the target may be ascertained based on the predetermined offset of at least one of the PRFs. In some applications, the reflected radar signals are associated with a plurality of chirp groups of a plurality of chirp sequences, and the unique PRF is assigned to each of the plurality of chirp groups of the plurality of chirp sequences in a single transmission frame.

In various implementations, the plurality of transmitters are grouped in respective transmitter groups. Each group transmits its radar signals spaced from radar signals transmitted by the other transmitter groups using respective co-prime spacing values. The reflected radar signals may be associated with source transmitters based on the co-prime spacing values. These transmitter groups may, for example, each be associated with one of the chirp groups. Such approaches may utilize co-prime integer values, in which the greatest common divisor of these values is 1, as candidates.

Positional characteristics of the target may be assessed in a variety of manners, based on peak positions in spectra of the reflected radar signals that are aligned to one another, for respective ones of the transmitter groups. In a particular embodiment, Doppler spectra of the received radar signals may be computed and used for identifying a peak position in an unwrapped version of the Doppler spectra, at which peaks for the received reflected radar signals from each of the respective transmitter groups are above a detection threshold and aligned to one another. The identified peak position may, for example, be used to determine positional characteristics of the target. In another embodiment, misaligned peaks are identified in spectra of the received reflected radar signals, and positional characteristics are ascertained using peaks that are not identified as misaligned (e.g., the misaligned peaks may be disregarded).

Another embodiment is directed to an apparatus having receiver circuitry and processing circuitry. The receiver circuitry is configured to receive MIMO co-prime radar signals transmitted by a plurality of transmitters and reflected from one or more targets. The processing circuitry is configured to process the reflected radar signals by resolving ambiguities associated with a range-Doppler detection, based on unique PRFs associated with respective chirp groups of the reflected radar signals. The processing circuitry is further configured to apply phase compensation to compensate for motion-induced phased biases and, thereafter, reconstruct Doppler estimates to provide a dealiased version of the reflected radar signals. The apparatus may also include transmission circuitry including the plurality of transmitters in respective transmitter groups. The transmitters in each group are configured to transmit radar signals spaced relative to radar signals transmitted by transmitters in each of the other transmitter groups using respective co-prime spacing values. The processing circuitry may, for example, associate the reflected radar signals with source transmitters based on the co-prime spacing values.

Each respective chirp group may correspond to one of the groups of transmitters, with the transmitters in each transmitter group being operable for transmitting radar signals at a PRF that is different than respective PRFs of radar signals transmitted by the transmitters in another one of the transmitter groups. In some implementations, the transmitters in each of the transmitter groups transmit radar signals at PRFs that are offset from PRFs used by the transmitters in another one of the transmitter groups by a predetermined offset. In such implementations, the processing circuitry ascertains positional characteristics of the target based on the predetermined offset of at least one of the PRFs.

The processing circuitry may operate in a variety of manners, to suit particular applications. For instance, the processing circuitry may compute the Doppler spectra of the received radar signals and identify a peak position in an unwrapped version of the Doppler spectra. This position may be identified as locations at which signals from each of the respective transmitter groups have peaks above a detection threshold and aligned to one another. The identified peak position may be utilized to determine positional characteristics of the target. In some implementations, the processing circuitry associates transmitted radar signals reflected from at least one target with a plurality of chirp groups of a plurality of chirp sequences, and assigns one of the unique PRFs to each of the plurality of chirp groups of the plurality of chirp sequences in a single transmission frame. In certain implementations, the processing circuitry ascertains positional characteristics of the target by identifying misaligned peaks in spectra of the received reflected radar signals, and ascertaining the positional characteristics using peaks that are not identified as misaligned.

As characterized herein, unwrapping or unrolling radar spectra is carried out based on signal processing theory, in which the spectrum of a discretely sampled signal is periodic in nature and has unambiguously describable frequency range between 0 [Hz] and Fs [Hz] where Fs is the sampling frequency, or one over the sampling interval. This may be referred to as a $2\pi$ spectrum of a signal in which its $2\pi$ radian corresponds to Fs. The spectrum of a sample signal may be an infinitely repeated spectrum of the $2\pi$ spectrum, which may be referred to as an infinitely unwrapped spectrum or unrolled spectrum. Where the sampling frequency is not fast enough to describe a signal's frequency components in an under-sampling condition, ambiguity may occur and the true frequency component may show up in the 0 to Fs (or 0 or $2\pi$) spectrum in modulo-Fs (or modula-$2\pi$) fashion. By unwrapping the $2\pi$ spectrum a sufficient number of times, one of the unwrapped spectrum components may correspond to the correct frequency. Accordingly, a correct peak may be identified as a peak position where transmitter peaks (e.g., most or all) are above a detection threshold and aligned. Incorrect unrolled radial velocity detections result in misaligned peaks and can be identified (e.g., and ruled out).

In some implementations, approaches as characterized herein may be carried out using single-frame processing and utilizing arbitrary number of transmitters to be used for TDM MIMO virtual array construction. This approach may also be implemented with multiple-target scenarios in which some or all targets may have a different integer-$2\pi$ Doppler/radial velocity ambiguity. Various MIMO virtual array geometries may be utilized.

In certain example embodiments, aspects of the present disclosure involve using respective MIMO arrays to provide a co-prime array configuration. Reflections of transmitted signals received in each array may be processed based on respective co-prime spacings between transmissions as effected by the MIMO arrays. Resultant arrays may thus be co-prime in terms of antenna spacing and number of elements. Such approaches may be particularly useful in automotive and other vehicle environments involving high-speed and use for high spatial resolution, for example with autonomous driving and driver assistance systems.

Turning now to the figures, FIG. 1 shows a radar apparatus 100 as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132 and co-prime, PRF-based positional assessment circuitry 134.

These components of apparatus 100 are operable to provide MIMO radar communications utilizing co-prime spacing, in connection with signals communicated with the radar processing circuitry 130, utilizing unique PRFs for respective chirp groups, as may be implemented in accordance with one or more embodiments herein. For instance, positional characteristics of a target from which radar signals transmitted by the transmission circuitry 122 via the antenna array 110 and having disparate PRFs for respective chirp groups, and which are reflected from the target and received by the reception circuitry via the antenna array, may be ascertained based on the PRF used in each group of radar signals, co-prime spacing associated with each antenna transmitting in the respective chirp groups, and phase characteristics of the reflected signals. In certain embodiments, the transmission circuitry 122 and reception circuitry 124 are respectively implemented in accordance with the transmitter and receiver circuitry as characterized in communication circuitry 220 in FIG. 2.

Figure 2:
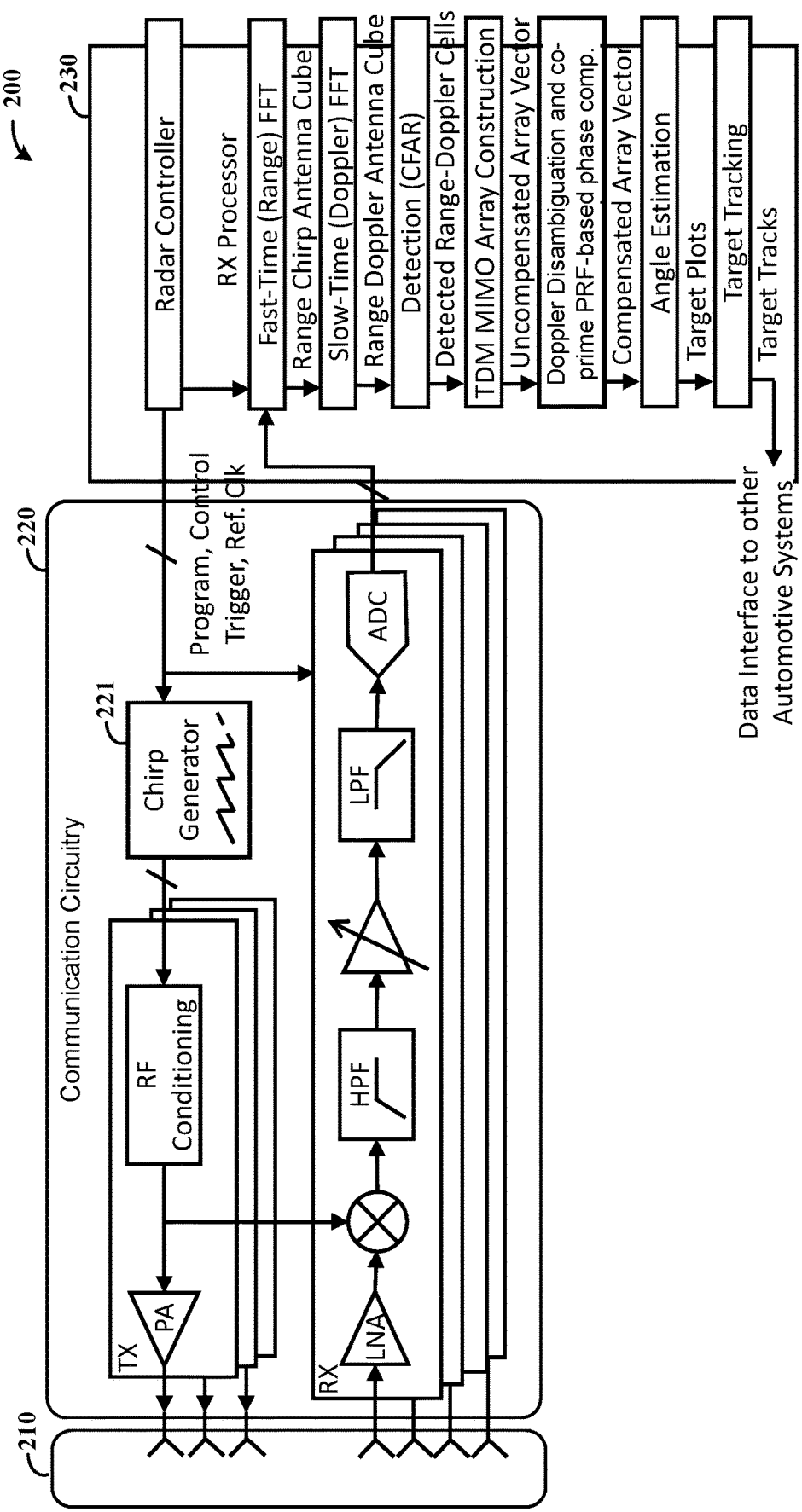
FIG. 2 shows notional a radar apparatus 200 with PRF-based phase compensation, in accordance with the present disclosure.

FIG. 2 shows a MIMO linear-chirp FMCW radar apparatus 200 with co-prime PRF-based phase compensation, as may be utilized for example with 76~81 GHz FMCW automotive radar systems. The apparatus 200 includes an antenna array 210, communication circuitry 220 and radar processing circuitry 230, and is operable to transmit successive groups of radar signals using respective PRFs that are specific to each group, and to utilize this along with co-prime spacing associated with respective groups to effect phase compensation. The communication circuitry 220 includes a plurality of transmitters and receivers (e.g., with three transmitters per group, and four receivers). Additional sets of communication circuitry 220 may be utilized for additional transmitter and/or receiver groups. As such, multiple additional groups of transmitters and/or receivers may be utilized. The transmitters may include a chirp generator 221 operable to generate respective chirps at PRFs corresponding to chirp groups, and may include other transmission circuitry such as conditioning and amplifier circuits, and operate in response to radar control circuitry within the radar processing circuitry 230.

The receivers may include amplifier, filtering and other circuits as useful for receiving radar signals. For instance, each receiver may mix a return radar reflection with a transmitted chirp and filter the result to generate deramped IF (intermediate frequency) signals to be sampled by ADCs and processed by a digital signal processing (DSP) unit to produce range and Doppler responses for each receive channel. For MIMO, multiple transmitters may transmit signals of varying PRFs in sequence so each signal can be separately received at all receivers. The range-Doppler response maps of the receivers from the transmitted signals may be aggregated to form a complete MIMO array measurement data cube consisting of range-Doppler response maps of antenna elements of a constructed MIMO virtual array. The range-Doppler responses may be non-coherently integrated and target detection may be attempted on the energy-combined range-Doppler map. A detection algorithm, such as may relate to variants of the CFAR algorithm, may be used to identify the range-Doppler cells in which targets may be present. For each detection cell, the array measurement vector may then be extracted and processed for identifying the incident angles of any target returns contained in the cell. The transmitters in communication circuitry 220 may set starting positions of each transmitters' first chirps with distinct offsets (e.g., with different and non-uniform PRFs).

Reflected radar signals received via the antenna array 210 and communication circuitry 220 are passed to the radar processing circuitry 230. The received signals are processed accordingly by utilizing the PRF variation and co-prime spacing for Doppler disambiguation and co-prime, PRF-based phase compensation as part of signal processing steps/functions. An output array vector is generated with phase compensation. The radar processing circuitry 230 may further carry out angle estimation and target tracking, using the compensated output array vectors, for tracking positional characteristics of targets from which reflections are received. Such target information may further be provided via a data interface to external systems, such as automotive systems.

Figure 3:
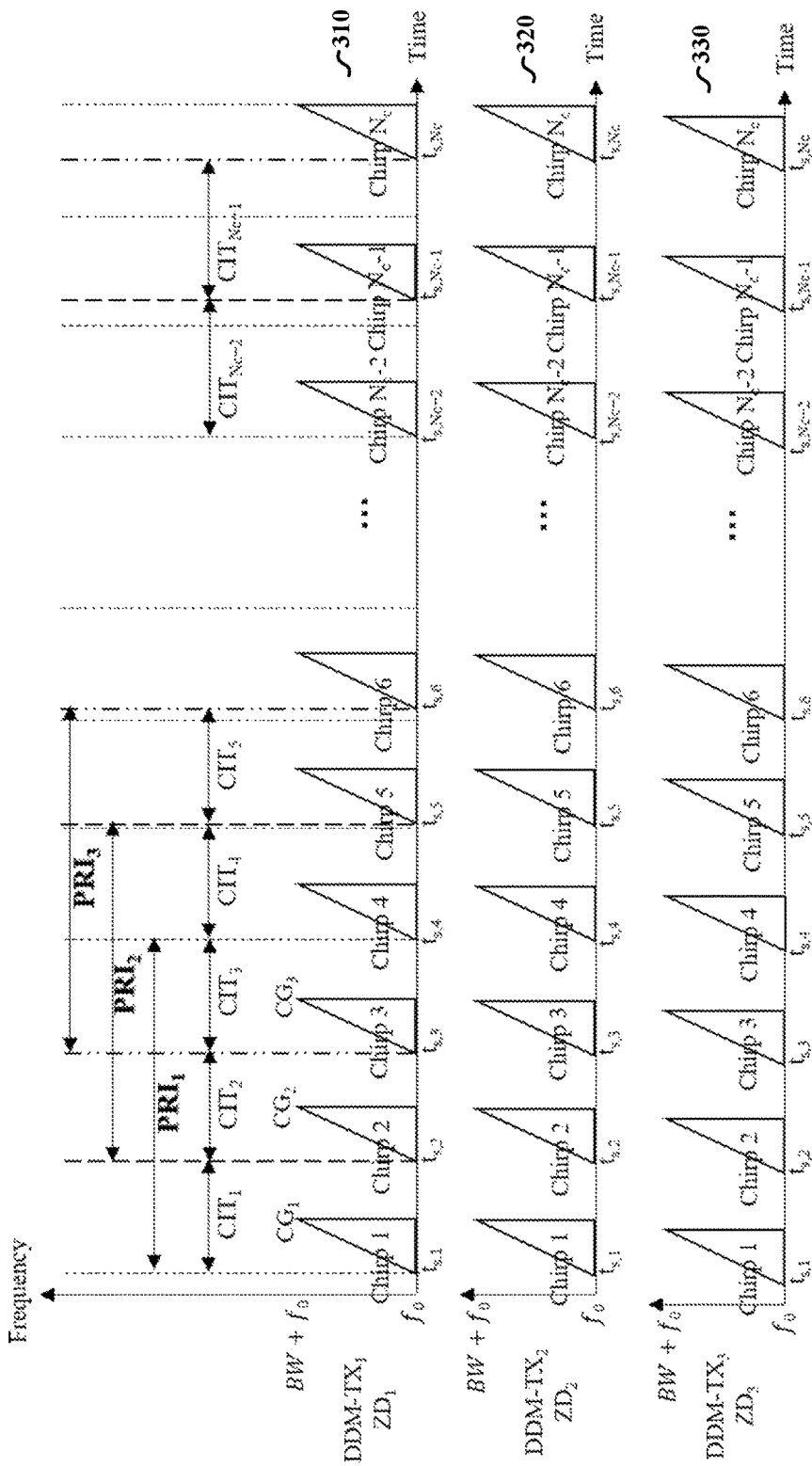
FIG. 3 shows plots of a radar chirp sequence, in accordance with the present disclosure.

FIG. 3 shows plots of a chirp sequence of a co-prime coded zero-doppler Doppler division MIMO radar with extended Doppler capability, as may be implemented in accordance with one or more embodiments. Plots 310, 320 and 330 are respectively shown for three transmitters $TX_1$, $TX_2$, and $TX_3$. The chip interval time (CIT) varies from chirp to chirp, and a distinct PRI/PRF is used for each chirp group (CG), with three groups shown as $CG_1$, $CG_2$, and $CG_3$ with $PRI_1$, $PRI_2$, and $PRI_3$ depicted as well.

Phase errors ($A_i$) present in chirp-group i's output may be compensated for targets with radial velocity $V_{ro}$ as:

$$A_i = \frac{4\pi}{\lambda} * V_{r0} * \sum_{k=1}^{i-1} CIT_k [Rad] (i = 1 \ldots \text{number of chirp groups})$$

where:
DDM MIMO Zero—Doppler spacing: $u_{1,2}=ZD_2-ZD_1$ [Rad]; $u_{2,3}=ZD_3-ZD_2$ [Rad];
$u_{3,1}=(ZD_1+2\pi)-ZD_3$ [Rad]
For CPC DDM MIMO, $[u_{1,2}, u_{2,3}, u_{3,1}]$ are coprime based values.

Figure 4:
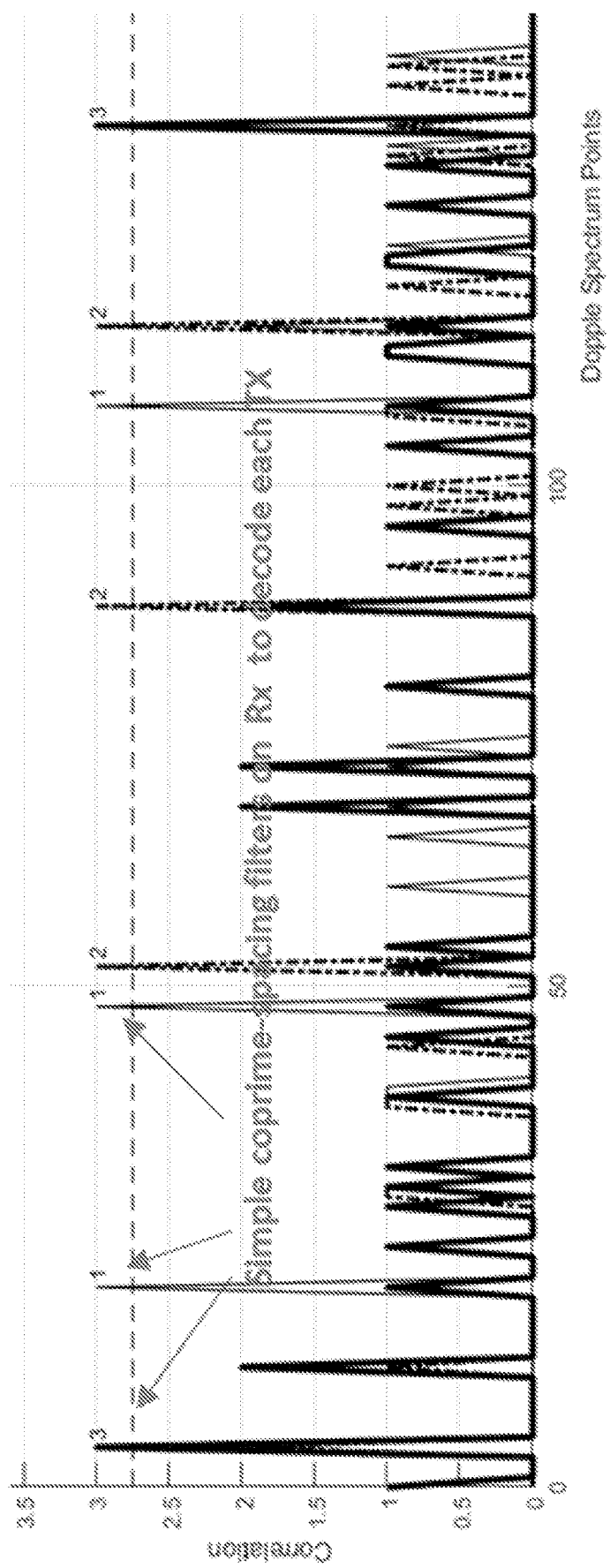
FIG. 4 shows a plot of radar signals from respective transmitters with peaks spaced at co-prime spacing, as may be implemented in accordance with one or more embodiments.

FIG. 4 shows a plot of radar signals from respective transmitters with peaks spaced at co-prime spacing, as may be implemented in accordance with one or more embodiments. Such an approach may be implemented for providing matching scores for associating or decoding a transmitter. The spacing between respective transmitters provides a code by which each peak can be assigned to its transmitter. Accordingly, as may be implemented with FIG. 3, unique co-prime spacing can be set between $TX_1$ and $TX_2$, between $TX_2$ and $TX_3$, and between $TX_3$ and $TX_1$. As such, $TX_1$ peaks are identified with three number "1" peaks as shown, $TX_2$ peaks are identified with three number "2" peaks, and $TX_3$ peaks are identified with two number "3" peaks (with the plot being truncated). The highest-score transmitter may be associated to the peak under test.

As examples, the Specification describes and/or illustrates aspects useful for implementing the claimed disclosure by way of various circuits or circuitry which may be illustrated as or using terms such as blocks, modules, device, system, unit, controller, transmitter, receiver, and/or other circuit-type depictions (e.g., reference numerals 120, 122, 124, 130, 132 and 134 of FIG. 1 depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing transmission, and also reception. Yet another process or method in this context would be recognized in connection with the functions/activities associated with blocks 220 and 230 of FIG. 2.

For example, in certain of the above-discussed embodiments, one or more modules are discrete logic circuits or programmable logic circuits configured and arranged for implementing these operations/activities, as may be carried out in the approaches shown in FIGS. 1-4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above, for instance in connection with the chirp plots depicted in FIG. 3, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first group", a "second group", etc., where the group might be replaced with terms such as transmitter or transmitter circuit, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to transmit . . . " is interpreted as "circuit configured to transmit . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, larger or smaller groups of transmitters, different co-prime spacing, and different PRFs may be utilized to suit particular applications. Further, an arbitrary number of chirp groups as well as arbitrary number of chirps may be provided where a non-overlapping chirp transmission constraint is met. Such modifications do not depart from the true spirit and scope of various aspects of the disclosure, including aspects set forth in the claims.

What is claimed is:

1. For use in a radar apparatus, a method comprising:
   in response to multi-input multi-output (MIMO) co-prime radar signals transmitted by a plurality of transmitters and reflected from at least one target, processing the reflected radar signals by:
      resolving ambiguities associated with a range-Doppler detection based on unique pulse repetition frequencies (PRFs) associated with respective chirp groups of the reflected radar signals by unfolding the Doppler spectrum of each chirp group, comprising:
         identifying misaligned peaks in spectra of the reflected radar signals; and
         ascertaining positional characteristics of the at least one target using peaks that are not identified as misaligned; and
      applying phase compensation to compensate for motion-induced phased biases; and
      after applying the phase compensation, reconstructing Doppler estimates to provide a dealiased version of the reflected radar signals.

2. The method of claim 1, wherein the plurality of transmitters include transmitters in respective transmitter groups, the radar signals in each transmitter group being spaced relative to the radar signals of the other transmitter groups using respective co-prime spacing values.

3. The method of claim 2, further including associating the reflected radar signals with source transmitters based on the co-prime spacing values.

4. The method of claim 1, including:
   computing the Doppler spectra of the reflected radar signals; and
   identifying a peak position in the unfolded version of the Doppler spectrum of each chirp group at which respective peaks for the reflected radar signals are above a detection threshold and aligned to one another.

5. The method of claim 4, including using the identified peak position to determine positional characteristics of the target.

6. The method of claim 1, wherein the transmitted radar signals reflected from at least one target are associated with a plurality of chirp groups of a plurality of chirp sequences, the method further including assigning the unique PRF to each of the plurality of chirp groups of the plurality of chirp sequences in a single transmission frame.

7. The method of claim 1, wherein each respective chirp group corresponds to a group of transmitters, each transmitter group transmitting radar signals at a PRF that is different than respective PRFs of radar signals transmitted in another one of the transmitter groups.

8. The method of claim 1, including ascertaining positional characteristics of the target based on peak positions in spectra of the reflected radar signals that are aligned to one another, for respective ones of the chirp groups.

9. The method of claim 1, including transmitting the radar signals for respective ones of the chirp groups in a timeslot that is shared by at least two of the chirp groups.

10. The method of claim 1, including:
    transmitting the radar signals for each of the respective chirp groups at PRFs that are offset from PRFs used by the other chirp groups by a predetermined offset; and
    ascertaining positional characteristics of the target based on the predetermined offset of at least one of the PRFs.

11. The method of claim 1, wherein resolving ambiguities associated with the range-Doppler detection comprises resolving ambiguity of radial velocity measurements.

12. An apparatus comprising:
    receiver circuitry to receive multi-input multi-output (MIMO) co-prime radar signals transmitted by a plurality of transmitters and reflected from at least one target; and
    processing circuitry to:
       process the reflected radar signals by:
          resolving ambiguities associated with a range-Doppler detection based on unique pulse repetition frequencies (PRFs) associated with respective chirp groups of the reflected radar signals by unfolding the Doppler spectrum of each chirp group, comprising:
             identifying misaligned peaks in spectra of the reflected radar signals; and
             ascertaining positional characteristics of the at least one target using peaks that are not identified as misaligned; and
          applying phase compensation to compensate for motion-induced phased biases; and
          after applying the phase compensation, reconstruct Doppler estimates to provide a dealiased version of the reflected radar signals.

13. The apparatus of claim 12, further including transmission circuitry having the plurality of transmitters, including transmitters in respective transmitter groups, the transmitters in each group being configured to transmit radar signals spaced relative to radar signals transmitted by transmitters in each of the other transmitter groups using respective co-prime spacing values.

14. The apparatus of claim 13, wherein each respective chirp group corresponds to one of the groups of transmitters, the transmitters in each transmitter group being configured to transmit radar signals at a PRF that is different than respective PRFs of radar signals transmitted by the transmitters in another one of the transmitter groups.

15. The apparatus of claim 12, wherein:
    the transmitters in each of the chirp groups are configured to transmit radar signals at PRFs that are offset from PRFs used by the transmitters in another one of the chirp groups by a predetermined offset; and
    the processing circuitry is to ascertain positional characteristics of the target based on the predetermined offset of at least one of the PRFs.

16. The apparatus of claim 12, wherein the processing circuitry is to associate the reflected radar signals with source transmitters based on co-prime spacing values between signals transmitted by respective ones of the transmitters.

17. The apparatus of claim 12, wherein the processing circuitry is to:
compute the Doppler spectra of the radar signals; and
identify a peak position in the unfolded version of the Doppler spectrum of each chirp group at which respective peaks for the received reflected radar signals are above a detection threshold and aligned to one another.

18. The apparatus of claim 17, wherein the processing circuitry is to use the identified peak position to determine positional characteristics of the target.

19. The apparatus of claim 12, wherein the processing circuitry is to associate transmitted radar signals reflected from at least one target with a plurality of chirp groups of a plurality of chirp sequences, and to assign one of the unique PRFs to each of the plurality of chirp groups of the plurality of chirp sequences in a single transmission frame.

20. The apparatus of claim 12, wherein the processing circuitry resolving ambiguities associated with the range-Doppler detection comprises resolving ambiguity of radial velocity measurements.

* * * * *